INVENTOR
IOAN DORÉ LANDAU

May 12, 1970          I. D. LANDAU          3,512,067
SPEED REGULATION OF ASYNCHROUS THREE-PHASE MOTORS
Filed Aug. 19, 1968          13 Sheets-Sheet 6

INVENTOR
IOAN DORE' LANDAU
BY
Arthur O. Klein
ATTORNEY

May 12, 1970    I. D. LANDAU    3,512,067
SPEED REGULATION OF ASYNCHROUS THREE-PHASE MOTORS
Filed Aug. 19, 1968    13 Sheets-Sheet 7

INVENTOR
IOAN DORE' LANDAU
BY
Arthur O. Klein
ATTORNEY

May 12, 1970     I. D. LANDAU     3,512,067
SPEED REGULATION OF ASYNCHROUS THREE-PHASE MOTORS
Filed Aug. 19, 1968     13 Sheets-Sheet 9

INVENTOR
IOAN DORE' LANDAU
BY
ATTORNEY

May 12, 1970     I. D. LANDAU     3,512,067
SPEED REGULATION OF ASYNCHROUS THREE-PHASE MOTORS
Filed Aug. 19, 1968     13 Sheets-Sheet 10

INVENTOR
IOAN DORE' LANDAU
BY
Arthur O. Klein
ATTORNEY

May 12, 1970     I. D. LANDAU     3,512,067
SPEED REGULATION OF ASYNCHROUS THREE-PHASE MOTORS
Filed Aug. 19, 1968     13 Sheets-Sheet 11
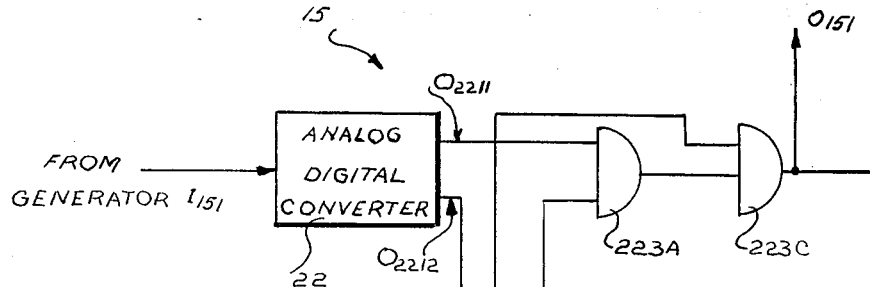
FIG. 15
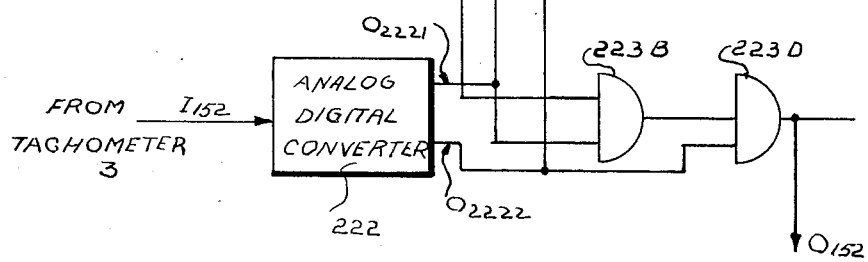
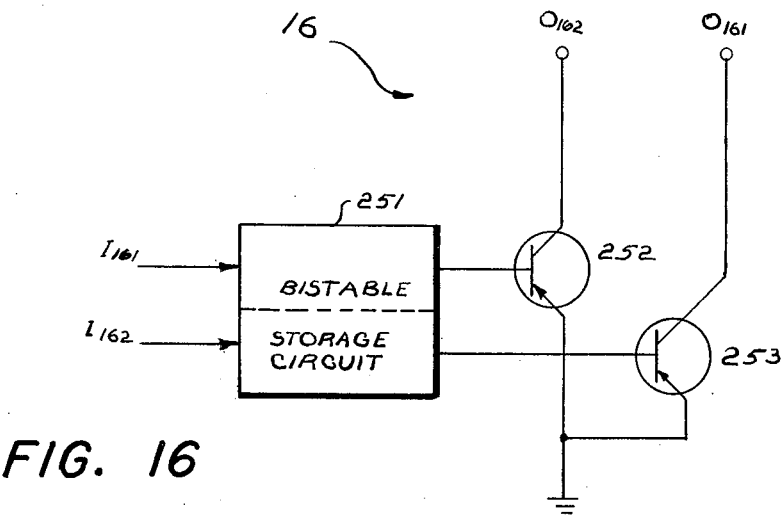
FIG. 16
INVENTOR
IOAN DORE' LANDAU
BY Arthur O. Klein
ATTORNEY

United States Patent Office 3,512,067
Patented May 12, 1970

3,512,067
SPEED REGULATION OF ASYNCHRONOUS THREE-PHASE MOTORS

Ioan Doré Landau, Bucharest, Rumania, assignor to Ministerul Industriei Constructiilor de Masini, Bucharest, Rumania
Continuation-in-part of application Ser. No. 534,493, Mar. 15, 1966. This application Aug. 19, 1968, Ser. No. 754,530
Claims priority, application Rumania, Mar. 25, 1965, 49,465
Int. Cl. H02p 7/62
U.S. Cl. 318—227
10 Claims

ABSTRACT OF THE DISCLOSURE

A reversible speed control arrangement for a three-phase squirrel cage induction motor employs independent regulation of the motor flux. The phases of the stator winding are selectively excited in one of two opposite senses by a pulse-operated thyratron-like inverter. The output voltage of the inverter is regulated by a first signal proportional to the difference between a preset motor flux and the actual motor flux. The output frequency of the inverter is separately regulated by a second signal obtained by comparing the real portion of the instantaneous motor current with a reference current proportional to the difference between the actual motor speed and a preset motor speed.

RELATED APPLICATIONS

The instant case is a continuation-in-part of applicant's co-pending application now abandoned Ser. No. 534,493, filed Mar. 15, 1966.

BACKGROUND OF THE INVENTION

It is well known that the speed of the asynchronous motor having a three-phase stator winding may be controlled by regulating the voltage and frequency of the motor stator or rotor or both. The stator power supply for such three-phase motors is often of the inverter type, which converts a DC voltage to a three-phase AC excitation voltage for the stator winding. One type of such inverter (the so-called "cyclo-inverter") is operated directly by analog signals. One example of this is described in U.S. Pat. No. 3,353,081, issued to H. Stemmler on Nov. 14, 1967, which employs a composite analog control signal that is modulated simultaneously by quantities proportional to the stator voltage and frequency.

A second type of such inverter employs a plurality of pulse-operated thyratron-like switching devices (such as thyristors or silicon controlled rectifiers) for interconnecting the source of DC voltage with the three-phase stator winding. In one such device, which is described in U.S. Pat. 3,348,110 issued to F. Koppelmann on Oct. 17, 1967, the rotor resistance of a wound-rotor induction motor is adjusted together with the voltage of a fixed frequency inverter-type stator power supply employing pulsed thyristors to provide the required regulation. Such a scheme is unsuitable, of course, for induction motors of the squirrel-cage type where separate control of the rotor is not feasible. Another such pulsed inverter arrangement is described in U.S. Pat. 2,784,365 issued to R. W. Fenemore et al. on Mar. 5, 1957, wherein means are provided for varying the amplitude of the DC voltage applied to the inverter in order to vary the stator voltage in a manner proportional to the operating frequency. While this expedient can maintain the energizing flux of the motor reasonably constant at relatively high values of motor speed, the relationship between speed and voltage of squirrel cage induction motors is not linear at lower speeds, so that the ability of the motor to maintain and operate with a carefully controlled energizing flux under such conditions is severely impaired.

SUMMARY OF THE INVENTION

A system for regulating the speed of a three-phase asynchronous motor of the squirrel-cage type driven by a pulsed thyratron-type inverter, while maintaining virtually constant flux over a wide range of motor speeds, is provided by the present invention. In an illustrative embodiment, a motor speed regulator generates a reference value of motor current proportional to the difference between the actual motor speed and a preset motor speed. A current regulator, connected in cascade with the speed regulator, generates a first analog DC signal proportional to the difference between the reference current and the real part of the instantaneous motor current. The first analog signal is converted to a plurality of substantially identical overlapping pulse sequences whose repetition frequency is a function of the magnitude of the first analog signal. The pulse sequences individually condition a plurality of first thyratron-like devices (hereafter "first devices") in the inverter at the same rate for operation in a pattern effective to define a three-phase stator excitation in one of two opposite senses. During the conditioned interval of each first device, a first succession of impulses is applied to the control electrodes of the first devices from a clock source whose frequency is higher than the conditioning rate of the first devices. The first impulses operate the first devices in the conditioned pattern.

The excitation voltage of the stator winding is regulated by a second analog DC signal proportional to the difference between the instantaneous motor flux and a preset motor flux. This second analog signal is converted to a second succession of impulses occurring at a rate proportional to the clock rate, but with successive second impulses being delayed with respect to successive first impulses from the clock source. The second impulses are applied to the control electrodes of a second plurality of thyratron-like devices (hereafter "second devices") connected in storage circuits that individually shunt the first devices for selectively disabling the operated ones of the first devices upon the occurrence of the second impulses. The output voltage of the inverter is proportional to the delay between the first impulses and the succeeding ones of the second impulses and thereby to the magnitude of the second analog voltage. With this arrangement the stator voltage is regulated in such a manner that the flux remains ideally constant irrespective of the instantaneous output frequency of the inverter.

While the above arrangement provides independent flux control over wide ranges of motor speeds, additional provision may be made to maintain the stator voltage, rather than the flux, constant when the motor approaches or exceeds a speed at which the measured stator voltage approaches a preset voltage. In addition, means may be provided for reversing the sense of the three-phase excitation of the stator winding by the inverter each time the relative senses of the actual motor speed and the preset motor speed reverse.

BRIEF DESCRIPTION OF THE DRAWING

The nature of the invention and its advantages will appear more fully from the following detailed description taken in conjunction with the appended drawing in which:

FIG. 15 is a logic diagram of a reversing switch suitable for use in the arrangement of FIG. 14;

FIG. 16 is a schematic diagram of a short circuiting device suitable for use with the reversing switch of FIG. 15;

DETAILED DESCRIPTION

Figure 1:
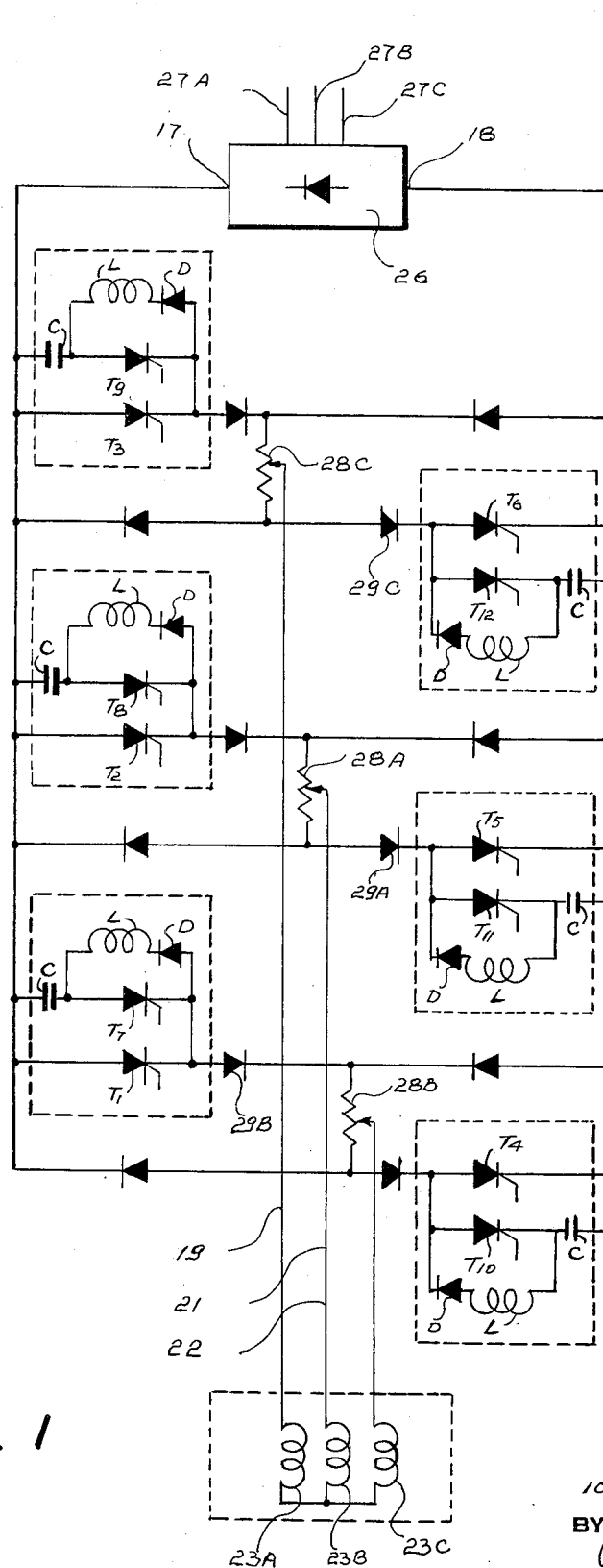
FIG. 1 is a schematic diagram of a pulsed, thyratron-like inverter for supplying a three-phase stator winding.
Figure 2:
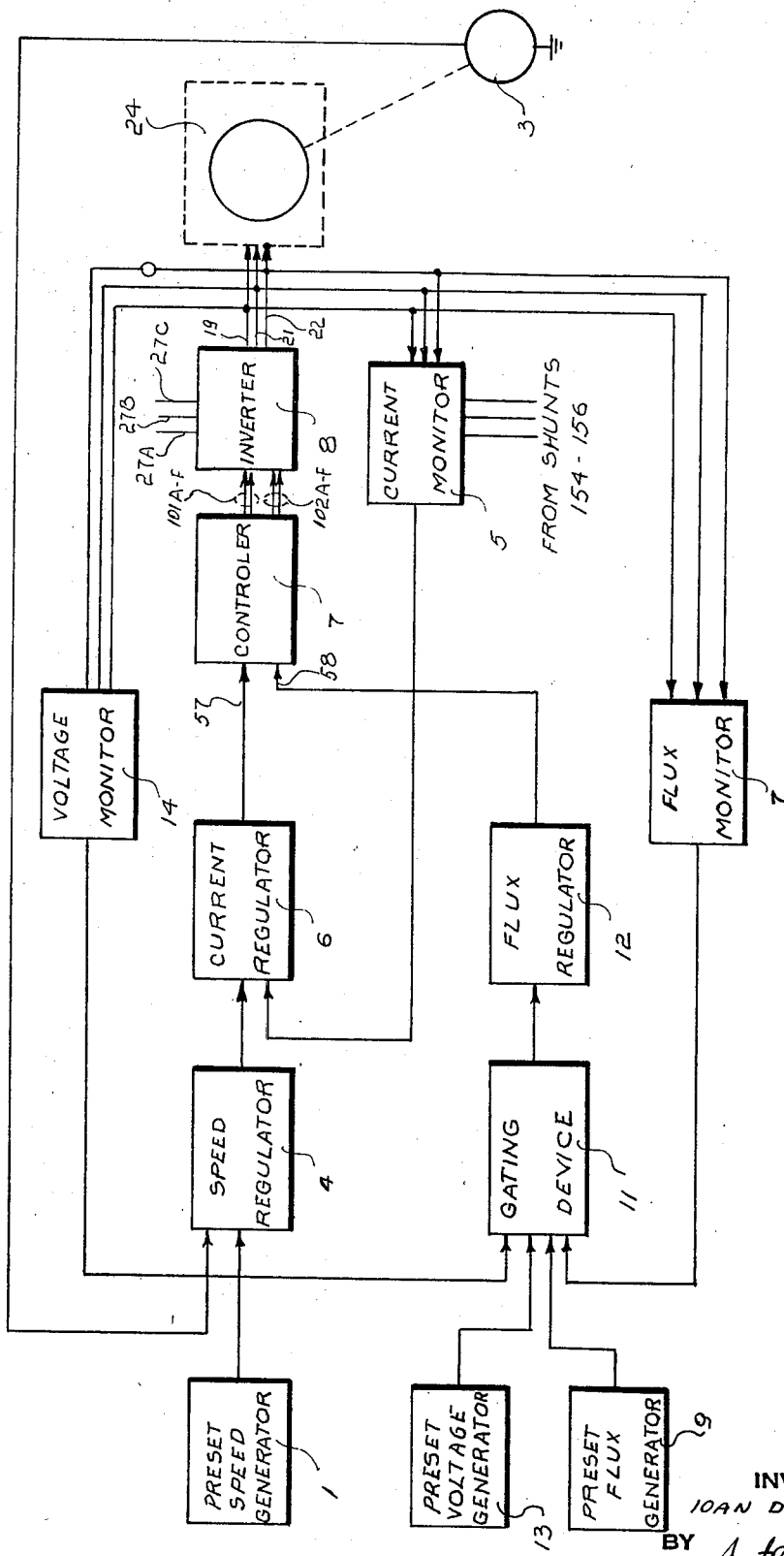
FIG. 2 is a block diagram of an arrangement for regulating the output voltage and frequency of the inverter of FIG. 1 in accordance with the invention.

Referring now in more detail to the drawing, FIG. 1 illustrates a pulsed, thyratron-like inverter 8 for converting a DC voltage appearing at a pair of terminals 17 and 18 to a three-phase stator winding 23A, 23B and 23C of a squirrel cage induction motor 24 (FIG. 2). The input DC voltage may be provided by a conventional three-phase rectifier represented generally by the block 26 (FIG. 2) which is supplied by three-phase AC mains 27A, 27B, and 27C.

Within the inverter 8, the conversion from the input DC voltage to the output three-phase AC voltage is accomplished by selectively exciting two serially connected groups of first normally inoperative thyratron-like switching devices $T_1$–$T_6$. The term "thyratron-like device," which in practice may be a thyristor or a silicon-controlled rectifier, indicates one of the well-known classes of switching devices which may be operated by the application of a suitable signal to a control electrode thereof and which may thereafter be deactivated only by disabling a transconductive path thereof, the control electrode being insensitive once activated by the control signal until the next-succeeding disabling of the transconductive path. Each of the devices $T_1$, $T_2$, and $T_3$ may be selectively coupled in series with one of the remaining devices $T_4$, $T_5$, and $T_6$ to apply the DC voltage appearing at the terminals 17 and 18 to a corresponding pair of the three-phase output leads 19, 21, and 22. For example, if the devices $T_1$ and $T_5$ are simultaneously operated, a conductive path is established from output line 21 to output line 22 via a tapped resistor 28A, a diode 29A, the operated device $T_5$, the rectifier 26, the operated device $T_1$, a diode 29b, and a tapped resistor 28B. If the devices $T_6$ and $T_1$ are simultaneously operated, a conductive path is completed between the output lines 19 and 22 via a tapped resistor 28C, a diode 29C, the operated device $T_6$, the rectifier 26, the operated device $T_1$, the diode 29B and the tapped resistor 28B. In like manner, it can be shown that the DC voltage appearing between the terminals 17 and 18 can be applied to any desired permutation of the output lines 19, 21 and 22 by selectively interconnecting one of the group of devices $T_1$–$T_3$ to one of the other group of devices $T_4$–$T_6$.

If the selected pairs of the devices $T_1$–$T_6$ are cyclically operated in a regular sequence, the corresponding pulses of DC voltage routed to the permuted stator winding 23A–23C of the motor 24 through the operated ones of the devices $T_1$–$T_6$ simulate a pulsed, three-phase excitation of the stator in a selected one of two opposite senses. If, for example, the devices $T_1$–$T_6$ are cyclically operated at a frequency $F_1$, a three-phase excitation of the stator winding in one sense may be accomplished by exciting selected pairs of the devices $T_1$–$T_6$ as shown in Table 1 at intervals of 60 degrees in the period corresponding to the excitation frequency $F_1$:

TABLE 1

| Electrical interval: | Operated devices |
|---|---|
| 0°–60° | $T_1$, $T_5$ |
| 60°–120° | $T_1$, $T_6$ |
| 120°–180° | $T_2$, $T_6$ |
| 180°–240° | $T_2$, $T_4$ |
| 240°–300° | $T_3$, $T_4$ |
| 300°–360° | $T_3$, $T_5$ |

In like manner, it can be shown that a three-phase excitation of the stator winding in the opposite sense may be accomplished by exciting selected pairs of the devices $T_1$–$T_6$ as shown in Table 2 at the same 60° intervals:

TABLE 2

| Electrical interval: | Operated devices |
|---|---|
| 0°–60° | $T_1$, $T_6$ |
| 60°–120° | $T_1$, $T_5$ |
| 120°–180° | $T_3$, $T_5$ |
| 180°–240° | $T_3$, $T_4$ |
| 240°–300° | $T_2$, $T_4$ |
| 300°–360° | $T_2$, $T_6$ |

The disabling of the devices $T_1$–$T_6$, once operated by pulses applied to their control electrodes, may be accomplished by energizing the control electrodes of a plurality of second normally inoperative thyratron-like devices $T_7$–$T_{12}$ individually connected in series with a capacitor C across the transconductive paths of the first devices $T_1$–$T_6$. The devices $T_7$–$T_{12}$ are respectively shunted by an inductance L and a diode D so that each of the devices $T_7$–$T_{12}$, when operated is automatically disabled by the operation of a storage circuit which includes the associated inductance L and capacitance C, the rectifier 26, and one or more of the resistance 28 and diodes 29. As will be described later, the operation of the respective second devices $T_7$–$T_{12}$ may be accomplished at the conclusion of a prescribed interval (i.e., the "operated interval") after the energizing of the associated one of the first devices $T_1$–$T_6$. If, as assumed above, the devices $T_1$–$T_6$ are cyclically operated in pairs at the frequency $F_1$, the effective output voltage across the then-connected pair of inverter output leads 19–22 will be determined by the fraction of the period corresponding to the frequency $F_1$, occupied by the time of operation of each of the devices $T_1$–$T_6$. Thus the frequency of the three-phase excitation of the stator phases 23A–23C by the inverter 8 will be proportional to the cyclic rate of excitation of the first device $T_1$–$T_6$, while the magnitude of the stator voltage will be proportional to the interval between the triggering of operation of each pair of the first devices $T_1$–$T_6$ and the triggering of operation of the shunting ones of the second devices $T_7$–$T_{12}$.

The output frequency of the inverter 8, and thereby the speed of the motor 24, is controlled by an analog speed control signal obtained by connecting a motor speed regulator 4 (FIG. 2) and a motor current regulator 6 in cascade in a manner similar to that disclosed in FIG. 1 of the above-mentioned U.S. Pat. 3,348,110. The outputs of the regulators 4 and 6 are individually proportional to the deviation of first and second monitoring voltages representative of actual motor speed and the real part of the actual motor current, respectively, from first and second voltages representing reference values of such quantities. The output of the speed regulator 4 serves as the reference value for the current regulator 6. The speed control signal is transmitted from the output of the current regulator 6 over a line 57. Moreover, in accordance with the invention, the output voltage of the inverter 8 is separately and independently controlled by an analog voltage control signal proportional to the deviation of a third monitoring voltage representative of the actual motor energizing flux from a third voltage representative of a predetermined reference value of such flux. The voltage control signal is generated in a suitable flux regulator 12 having an output line 58. In this way the stator voltage may be regulated in such a manner that the flux through the motor remains constant irrespective of the instantaneous output frequency of the inverter 8.

A controller 7 is provided for converting the analog speed and voltage control signals appearing on the lines 57 and 58 into two sets of pulse sequences respectively appearing on two sets of output lines 101A–101F and 102A–102F of the controller 7. The pulse sequences appearing on the line 101A–101F are coupled to the control electrodes of the first devices $T_1$–$T_6$ (FIG. 1) of the inverter 8, while the pulse sequences applied to the lines 102A–102F (FIG. 2) of the controller 7 are applied to the control electrodes of the second devices $T_7$–$T_{12}$ (FIG. 1).

The first monitoring voltage, which is proportional to the actual speed of the motor 24 is generated by a tachometer 3 (FIG. 2) coupled to the squirrel-cage rotor (not shown) of the motor 24. The motor speed is obtained from a generator 1 of a conventional type. The second monitoring voltage, which is proportional to the real component of the actual motor current, is obtained from a current monitoring device 5 coupled to the stator winding 23A–23C. (As indicated above, the reference value of current for the current regulator 6 is the output voltage of the speed regulator 4.) The third monitoring voltage, which is proportional to the instantaneous operating flux of the motor 24, is obtained through a suitable motor flux simulator 10 coupled to the stator winding, while the third reference voltage representative of a preset value of flux is obtained from a conventional generator 9.

In further accordance with the invention, provision is made for running the motor 24 at constant flux only up to a predetermined maximum speed and thereafter running the motor at constant stator voltage when the predetermined maximum speed is obtained or exceeded. This is accomplished by providing, at the input of the regulator 12, a combining and gating circuit 11 which is arranged to selectively decouple the signal proportional to the difference between the third monitoring and third reference voltages from the input of the regulator 12 and simultaneously couples thereto a quantity proportional to the difference between a fourth monitoring voltage and a fourth reference voltage. The fourth monitoring voltage, which is proportional to the actual motor stator voltage is generated by a voltage monitor 14, while the fourth reference voltage is proportional to a preset value of the motor voltage corresponding to the predetermined maximum speed as obtained from a suitable generator 13. The change-over from constant flux control to constant voltage control is arranged to occur when the difference between the third monitoring and third reference voltages is approximately zero, i.e. when the motor speed approaches the relatively high value represented by the preset voltage on the unit 13.

Figure 3:
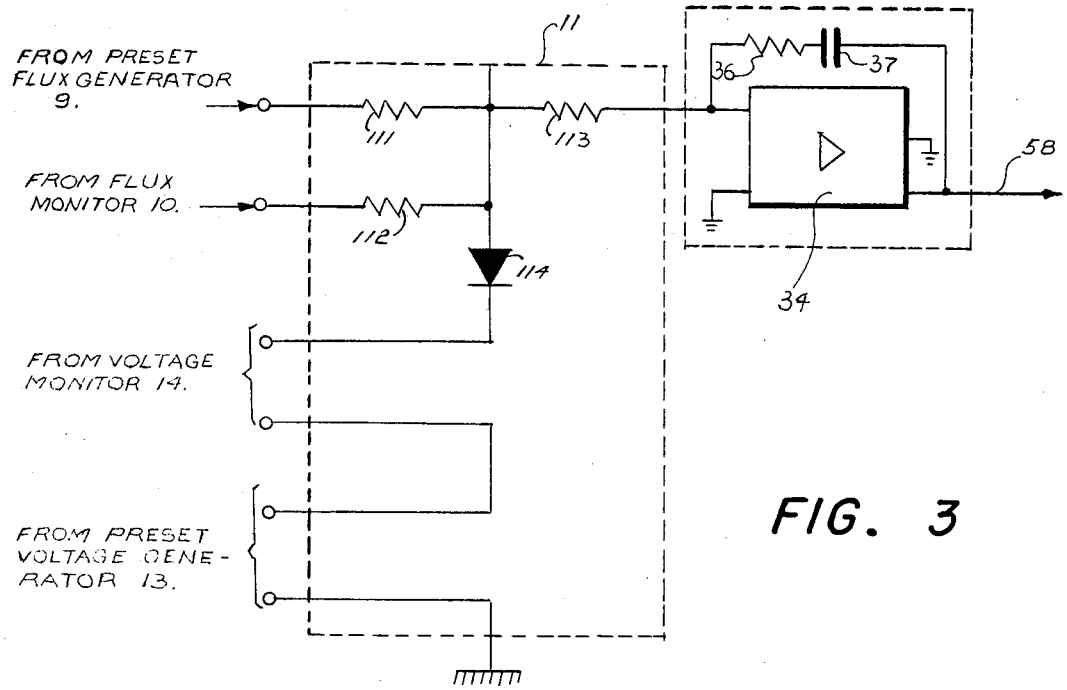
FIG. 3 is a schematic diagram of a regulator suitable for use with the arrangement of FIG. 2, together with means for selectively applying thereto one of two different signals for maintaining either a constant motor flux or a constant terminal voltage in a manner independent of the motor speed.

One arrangement of the gating circuit 11 and the controller 12 is shown in FIG. 3. The output of an amplifier 34, which appears on the line 58 to the controller 7 (FIG. 2), is fed back to the amplifier input via a resistor 36 (FIG. 3) and a capacitor 37. The output voltages of the generator 9 and the flux simulator 10 are respectively coupled through a pair of resistors 111 and 112 and algebraically added at the input of a resistor 113 to provide a first difference signal. The output of the resistor 113 is connected to the input of the amplifier 34. A second difference signal obtained by algebraically combining the voltages of the generator 13 and the voltage monitor 14 is applied to the input of the resistor 113 through a diode 114, which is inoperative when the actual motor voltage represented by the monitor 14 is less than the preset motor voltage represented by the generator 13. When the magnitude of the second difference signal approaches zero, the diode 114 conducts. If the resistor 113 is made large with respect to the internal resistance of the conducting diode 114 and the internal resistances of the generator 13 and monitor 14, the first difference signal is effectively short circuited and the second difference signal is now applied to the input of the amplifier 34 to effect the required change-over from constant flux to constant voltage regulation.

Figure 4:
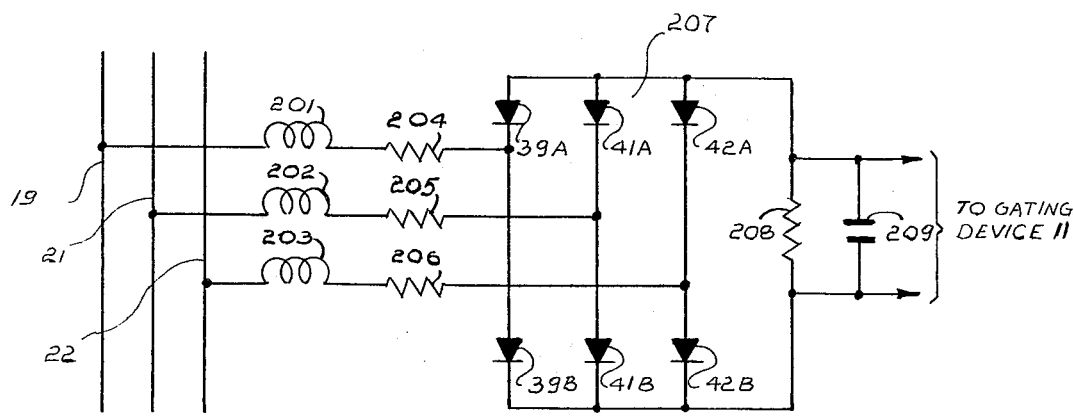
FIG. 4 is a schematic diagram of an arrangement coupled to the stator winding for generating a signal proportional to the instantaneous motor flux.

A suitable flux simulator 10 is shown in FIG. 4. The simulator includes three parallel pairs of serially-connected diodes 39A–39B, 41A–41B, and 42A–43B defining a three-phase bridge rectifier 207 the inverter output lines 19, 21, and 22 are individually coupled to the junctions of the three parallel pairs of diodes through monitoring paths including inductors 201, 202, and 203 and resistors 204, 205, and 206, respectively. An output DC component representative of the motor stator voltage is generated across a resistor 208 and a capacitor 209 connected in shunt with the respective pairs of diodes. The resistors 204, 205, and 206 and the inductors 201, 202, and 203 are chosen such that the time constant of each monitoring path is equal to $$\frac{L_S + L_L}{R_S}$$

where $L_S$ is the self-inductance of the stator, $L_L$ is the leakage inductance of the stator, and $R_S$ is the stator winding resistance.

Figure 5:
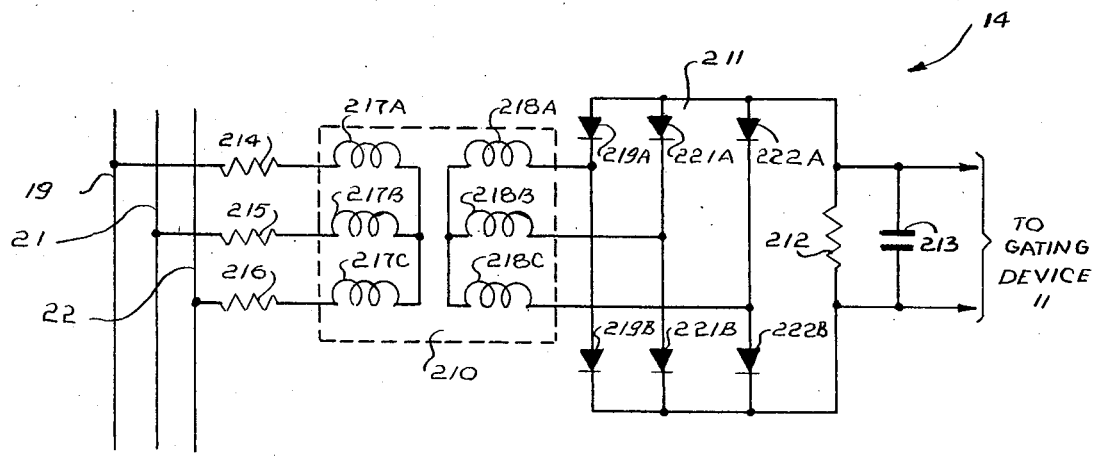
FIG. 5 is a block diagram of an arrangement coupled to the stator winding for producing a DC signal proportional to the stator voltage.

FIG. 5 is a schematic diagram of the stator voltage monitor 14. The monitor includes a three-phase bridge rectifier including three pairs of serially-connected diodes 219A–219B, 221A–221B, and 222A–222B. The three-phase voltages on the inverter output windings 19, 21, and 22 are respectively coupled to the junction of the diodes in each of the parallel pairs via three resistors 214, 215 and 216 and a three-phase transformer 210. The transformer 210 has a three-phase primary winding 217A–217C connected to the resistors 214, 215 and 216, and a secondary winding 218A–218C connected to the junctions of the respective diode pairs. The output voltage of the monitor 14 is generated across a resistor 212 and a capacitor 213 connected in shunt with the parallel pairs of diodes.

Figure 6:
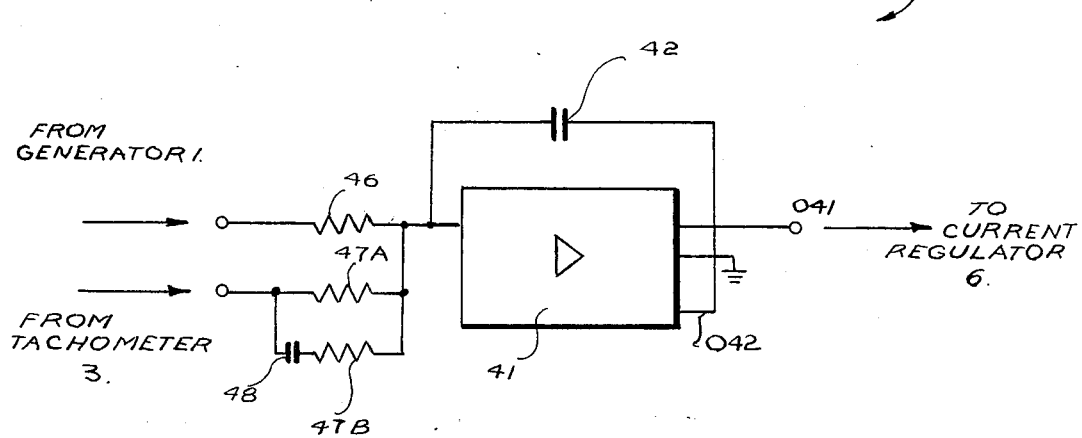
FIG. 6 is a schematic diagram of a motor speed regulator suitable for use in the arrangement of FIG. 2.

FIG. 6 is a schematic diagram of the speed regulator 4. The latter includes an amplifier 41 having a pair of equal and opposite outputs O41 and O42, at least one of which (illustratively the output O41) is coupled to the input of the current regulator 6. The output O42 is connected via a capacitor 42 to the input of the amplifier 41. The first reference voltage representing the preset motor speed is applied to the input of a resistor 46, the output of which is connected to the input of the amplifier 41. The first monitoring voltage from the tachometer 3 (FIG. 2) is coupled to the input of the amplifier 41 (FIG. 6) through two parallel paths, one containing a resistor 47A and the other containing a resistor 47B and a capacitor 48. Further details of such a speed regulator may be found in the article by K. Bohm and H. Bornhorst appearing in Siemens Zeitung, No. 8, pages 873–877 (1965).

Figure 7:
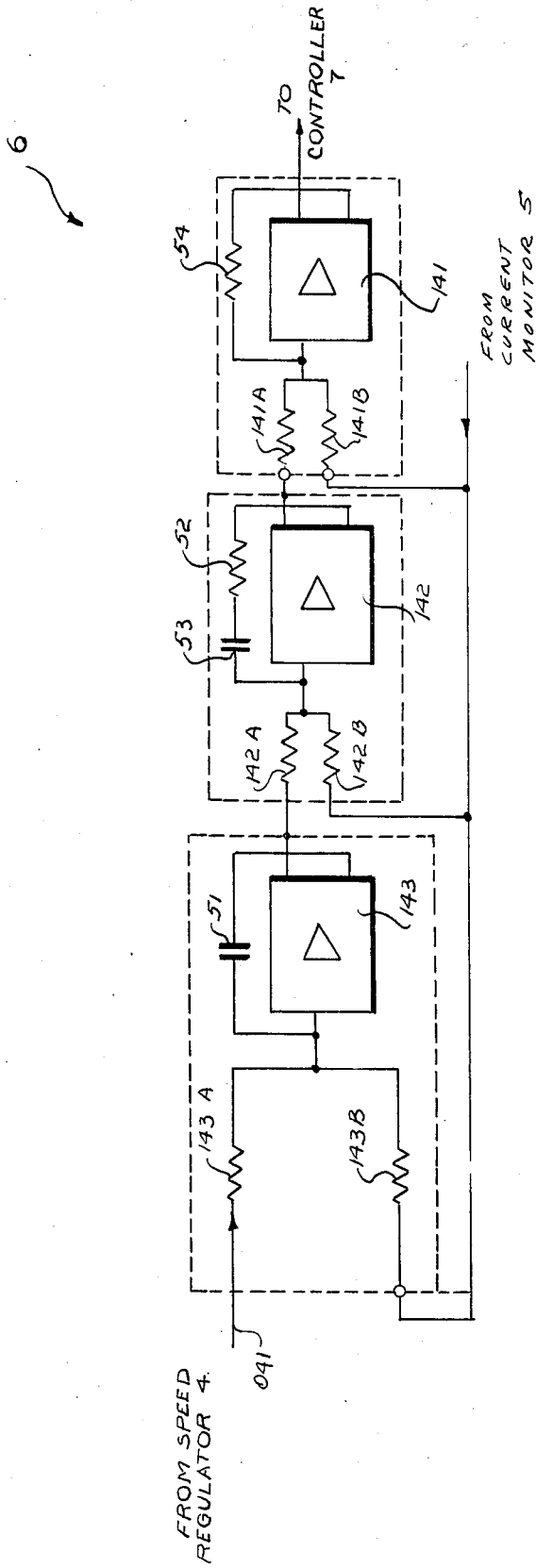
FIG. 7 is a schematic diagram of a motor current regulator suitable for use in the arrangement of FIG. 2.

FIG. 7 depicts an illustrative form of the current regulator 6. The regulator includes three amplifiers 143, 142, and 141 connected in cascade. Each of the amplifiers includes a pair of symmetrical outputs, one of which is coupled to its input through an associated feed back path. The feed back path of the input amplifier 143 includes only a capacitor 51. The feed back path of the intermediate amplifier 142 includes a resistor 52 in series with a capacitor 53. The feed back path of the output amplifier 141 includes a resistor 54 only.

The amplifiers 143, 142, and 141 are provided at their inputs with parallel combining resistances 143A–143B, 142A–142B, and 141A–141B, respectively. The inputs of the resistors 143A and 143B are respectively coupled to the output O41 of the speed regulator 4 and to the output of the current monitor 5 described below. The inputs of the resistors 142A and 142B are respectively coupled to an output of the amplifier 143 and the output of the current monitor 5. The inputs of the resistors 141A and 141B are respectively coupled to an output of the amplifier 142 and the output of the current monitor 5. Further details of this type of current regulator may be found in Transactions of the I.E.E.E. (IGA Group), vol. 2, No. 5, pages 334–340 (1966).

Figure 8:
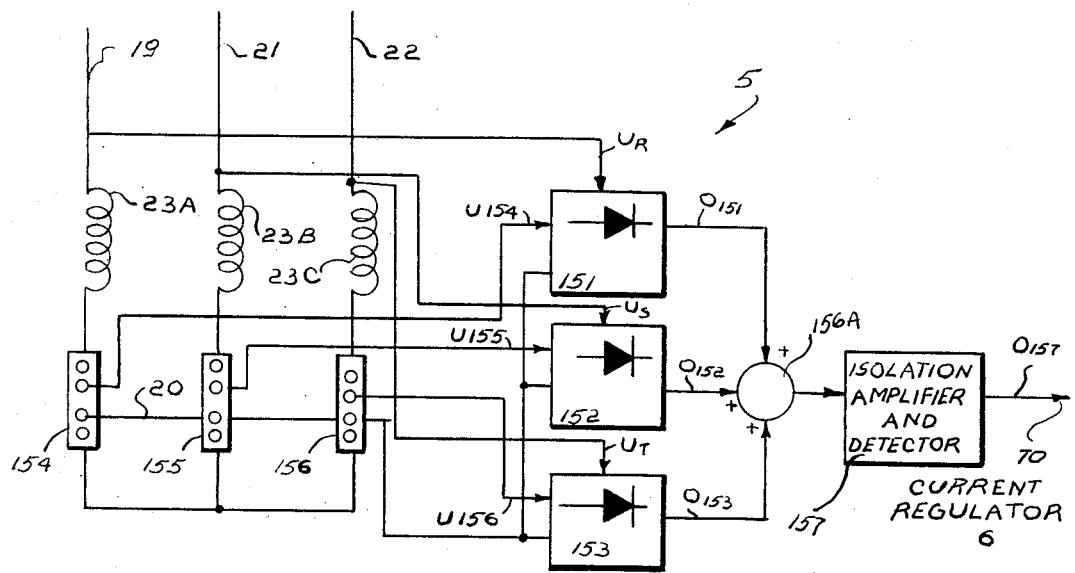
FIG. 8 is a block diagram of an arrangement coupled to the stator winding for supplying a DC signal proportional to the instantaneous real component of the motor current.

As shown in FIG. 8, the current monitor 5 which generates a quantity proportional to the reel component of the stator current includes three conventional, schematically depicted phase-sensitive rectifiers 151, 152, and 153. Three shunts 154, 155, and 156 are respectively disposed in the inverter output lines 19, 21, and 22. Voltages proportional to the currents in each of the lines 19, 21, and 22 and measured with respect to a common line 20 are developed across the associated ones of the shunts 154, 155, and 156 and applied to first inputs U154, U155, and U156 the rectifiers 151, 152, and 153. The individual stator line voltages, also measured with respect to the common line 20, are coupled to second inputs UR, US, and UT of the rectifiers 151, 152, and 153. Outputs O151, O152, and O153 of the rectifiers are added in a suitable combining circuit 156A, and the DC component thereof is detected and amplified in a suitable isolation amplifier and detector 157. The output O157 of the detector 157 is coupled to the current regulator 6.

Figure 9:
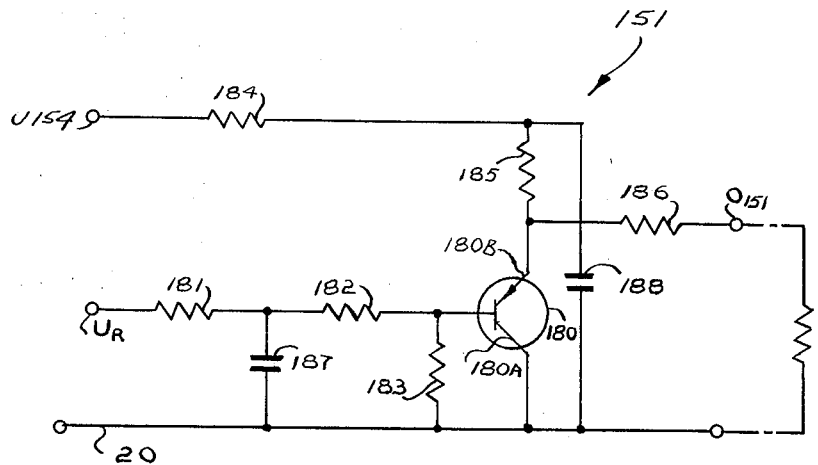
FIG. 9 is a schematic diagram of one portion of the arrangement of FIG. 8.

One type of phase sensitive rectifier (illustratively the rectifier 151) suitable for the monitor 5 is shown in more detail in FIG. 9. The rectifier 151 includes a transistor 180, the base of which is coupled to the second input UR through a pair of resistors 181 and 182. The junction of the resistors 181 and 182 is connected to a collector 180A of the transistor through a capacitor 187, and the transistor base is coupled to the collector 180A through a resistor 183. The collector is coupled to the common line 20. The first input U154 is applied to emitter 180B of the transistor 180 through a pair of resistors 184 and 185. The junction of the resistors 184 and 185 is coupled to the common line 20 through a capacitor 188. The rectifier output O151 is coupled to the emitter 180B through a resistor 186.

Figure 10:
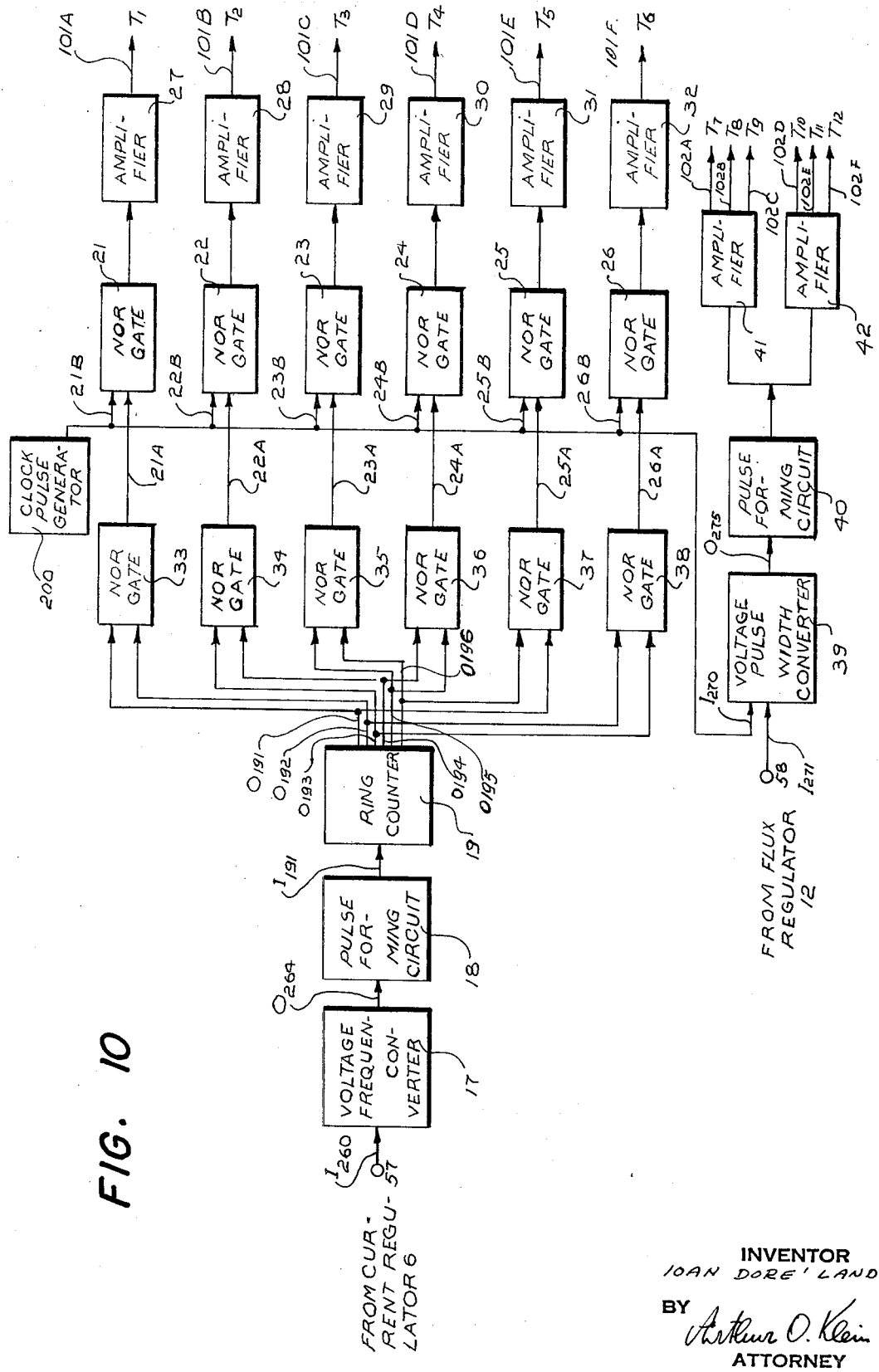
FIG. 10 is a more detailed block diagram of a portion of the arrangement of FIG. 2.
Figure 11:
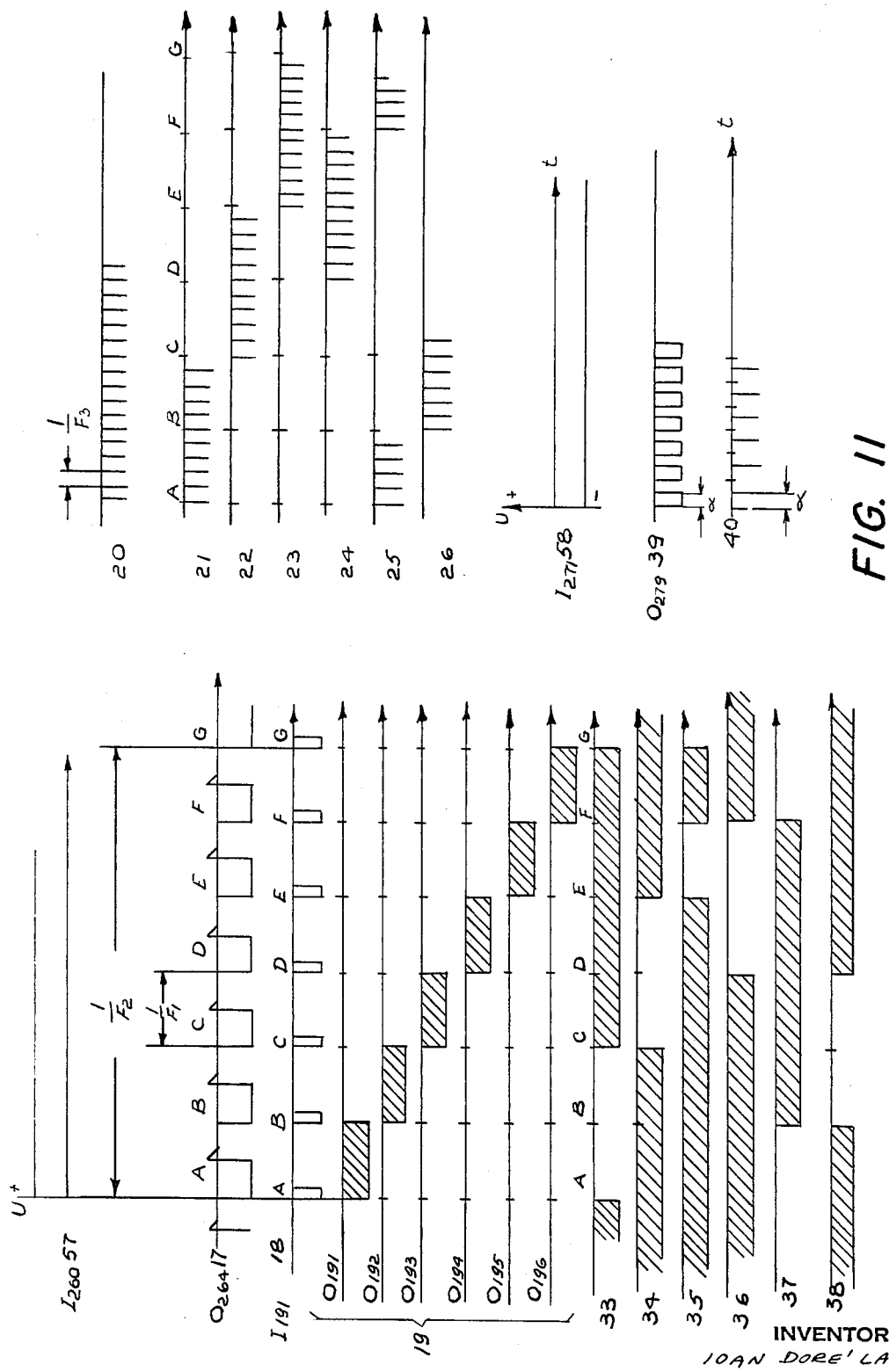
FIG. 11 is a set of wave forms occurring at different points of the arrangement of FIG. 10.

The controller 7 is shown in more detail in FIG. 10. The analog speed control signal I260 incident thereon over the line 57 from the current regulator 6 is applied to a voltage frequency converter 17, which may be of the type described below in connection with FIG. 12. (The output wave forms of each of the components of the controller 7 are identified by corresponding designations in FIG. 11.) The converter 17 generates, on an output O264 (FIG. 10), a sequence of pulses occurring at a rate $F_1$ proportional to the magnitude of the analog voltage on the line 57. The sequence of relatively wide pulses O264 is converted to a sequence of narrow impulses occurring at the same rate $F_1$ by a conventional pulse forming circuit 18. This impulse sequence, designated I191, triggers a six-element, conventional ring counter 19 which individually provides, on a plurality of output leads O191–O196, six successively delayed pulse sequences each having a repetition rate $F_2 = \frac{1}{6} F_1$ and a pulse width equal to one period of the input frequency $F_1$ (e.g., ⅙ of a period of the rate $F_2$). Selected pairs of the outputs of the ring counter 19 are applied to the inputs of six first NOR gates 33–38. The connection pattern of the ring counter outputs to the gates 33–38 is chosen to yield six overlapping second pulse sequences each of which has (a) the repetition frequency $F_2$; (b) a pulse width equal to ⅓ of a period represented by the frequency $F_2$; and (c) a mutual overlap of ⅙ of the latter period. For example, as shown in FIG. 11, if the time A represents the time origin, the pulse sequence at the output of the gate 33 (i.e., the "sequence 33") is in a first state for the first 120° of its repetition cycle, and in a second state for the remainder of the cycle; the pulse sequence 38 is in its first state from 60 to 180°; the pulse sequence 34 from 120 to 240°; the sequence 36, from 180 to 300°; the sequence 35 from 240 to 360°; and the sequence 37, from 300 to 360° and from 0 to 60°. Because of the overlap of the pulse sequences, two of the sequences 33–38 are always in their first state at any one time.

The outputs of the gates 33–38 (FIG. 10) are individually applied to conditioning inputs 21A–26A to six second NOR gates 21–26. Thus the gates 21–26 are conditioned in an overlapping pattern corresponding to that of the pulse sequences on the outputs of the first gates 33–38. The second gates 21–26 are further provided with a plurality of enabling inputs 21B–26B through which suitable operating signals may be outpulsed to the control electrodes of the first devices $T_1$–$T_6$ in the inverter 8 (FIG. 1) through a corresponding plurality of impulse amplifiers 27–32 (FIG. 10) during the conditioned intervals of the associated gates 21–26. As a result, the first devices $T_1$–$T_6$ are "conditioned" in an overlapping sequence corresponding to that of the pulses on the outputs of the first gates 33–38. In particular, the first devices $T_1$ and $T_5$ associated with the sequences 33 and 37 are conditioned for operation during the first 60° of the repetition cycle commenced at the time A of FIG. 11; the devices $T_1$ and $T_6$ associated with the sequences 33 and 38 are conditioned during the next 60°; and so on. It will be noted that the sequence of conditioning of the devices $T_1$–$T_6$ corresponds to the excitation pattern shown above in Table 1 for imparting, to the stator windings 19, 21 and 22, the one sense of the three-phase excitation. The output frequency of the inverter 8 (FIG. 1) is determined by the conditioning rate $F_2$, which in turn is proportional to the analog speed control voltage on the line 57 (FIG. 10).

The operating signals applied to the enabling inputs 21B–26B of the second gates 21–26 are obtained from a clock generator 200, which outpulses a sequence of first impulses occurring at a repetition rate $F_3$ which may be proportional to and several times larger than the frequency $F_1$ of the pulses applied to the ring coupler 19. Thus, during each conditioned interval of the second NOR gate 21, for example, a succession of first clock impulses occurring at the rate $F_3$ is gated through the amplifier 27 to turn on the device $T_1$. Similar excitation of the devices $T_2$–$T_6$ is accomplished by gating the clock impulses from the generator 20 through the conditioned ones of the second gates 22–26 at the repetition rate $F_3$.

The operation of the second, or "turn-off" devices $T_7$–$T_{12}$ by the controller 7 is regulated by the voltage control signal I271 applied to the input of a voltage pulse width converter 39 over the line 58. The converter 39, which is described below in more detail in connection with FIG. 13, generates, on an output O275, a sequence of pulses occurring at a rate synchronized with and proportional to the first clock rate $F_3$ and having a pulse width $\alpha$ equal to a fraction of its repetition period determined by the magnitude of the control signal I271. The pulses O275 are applied to the input of a pulse forming circuit 40, which is triggered by the trailing edge of each of the pulses O275 to generate a corresponding sequence of second clock impulses occurring at the repetition rate of the pulses O275. The second clock impulses are coupled to the control electrode 5 of the devices $T_7$–$T_{12}$ through amplifiers 41 and 42. The second clock pulses are delayed by the interval with respect to the start of each repetition period of the pulses O275 which is in turn synchronized with the start of the repetition period of selected ones of the first clock impulses. Thus, occurrences of the second sequences of clock impulses on the output of the circuit 40 are correspondingly delayed with respect to the occurrences of the first clock impulses at the output of generator 200; accordingly, the devices $T_1$–$T_6$ are each operated only over the interval during each excitation period of the pulses O275. The output voltage of the stator windings 19, 21 and 22 (FIG. 1) is proportional to the quantity and thereby to the magnitude of the analog control signal on the input 58 (FIG. 10).

Figure 12:
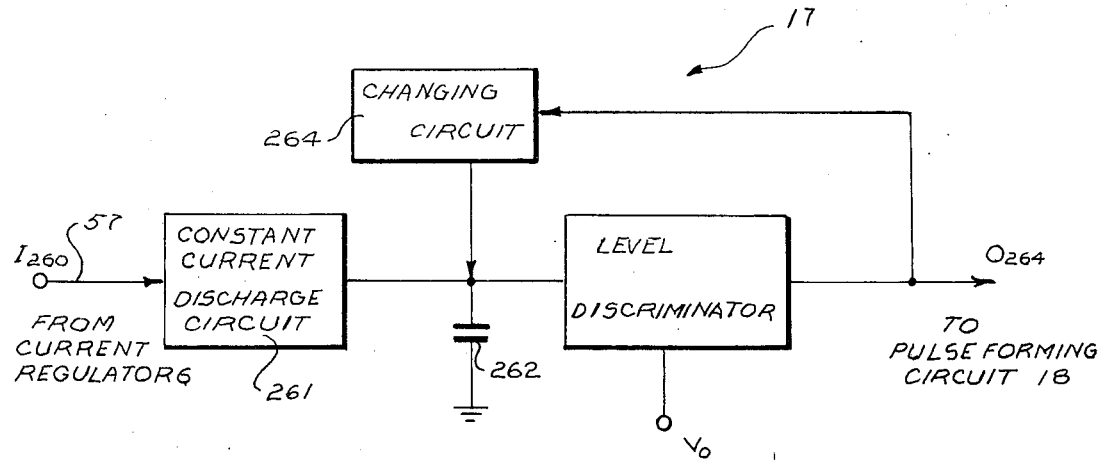
FIG. 12 is a block and schematic diagram of a voltage-frequency converter suitable for use in the arrangement of FIG. 10.

One embodiment of the voltage frequency converter 17 of FIG. 10 is shown in FIG. 12. The analog speed control signal voltage I260 from the current regulator 6 is applied over the line 57 to a triggering input of a constant current discharge circuit 261, which may be a high resistance whose magnitude varies in proportion to the amplitude of the voltage I260. The circuit 261 is coupled across a capacitor 262, which may be charged rapidly through a pulse-operated charging circuit 264. Assuming that the capacitor is initially charged to an initial voltage $V_{MAX}$ by the charging circuit 264, the application of the voltage I260 to the circuit 261 causes the capacitor 262 to discharge at a constant rate proportional to the magnitude of the voltage I260. When the voltage of the capacitor has discharged for a time sufficient for its voltage to drop to a prescribed second level $V_O$, a conventional level discriminator 263 is triggered and applies an output pulse O264 to the input of the pulse forming circuit 18 (FIG. 10) and to the triggering input of the charging circuit 264 (FIG. 12), which immediately restores the capacitor voltage to $V_{MAX}$.

Since the level discriminator 263 emits a pulse O264 each time the voltage of the capacitor 262 drops from $V_{MAX}$ to $V_O$, the repetition rate of the converter 17 is proportional to the rate of discharge of the capacitor 262 and thereby to the magnitude of the speed control voltage I260 on the lead 57.

Figure 13:
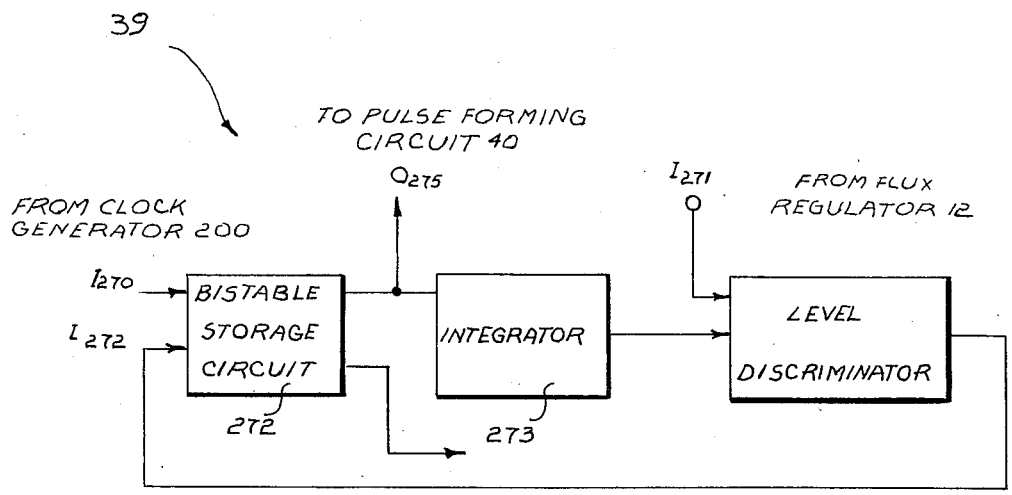
FIG. 13 is a block and schematic diagram of a voltage-pulse width converter suitable for use in the arrangement of FIG. 10.

One embodiment of the voltage pulse width converter 39 of FIG. 10 is shown in FIG. 13. The voltage control signal I271 on the input lead 57 is applied to one input of a conventional level discriminator 274. The output of the discriminator 274 is applied to one input I272 of a bistable storage circuit or flip-flop 272. The other input I270 to the storage circuit 272 is the first clock pulse sequence from the clock generator 200. It will be assumed that an output pulse from the converter 39 which appears on the lead O275 of the storage circuit 272 scans only when a clock pulse is applied to the input I270 of the circuit 272. Thus, in the absence of clock pulses no excitation signal is provided for an integrator 273 whose input is coupled to the lead O275 and whose output is coupled to the other input of the discriminator 274. Each time a clock pulse is applied over the lead I270, a pulse appears on the output O275 and the integrator capacitor (not shown) starts to charge. The capacitor output voltage increases until it reaches the level corresponding to the instantaneous value of the voltage control signal I271. Upon reaching this level, the discriminator 274 emits a pulse to the input I272, which disables the output 275. If the charging rate of the integrator 273 is assumed to be fixed, the duration of each pulse O275 is the time necessary for the integration output to reach the threshold level of the discriminator 274, which time is in turn proportional to the magnitude of the voltage on lead 57. Each turn-off of the pulse O275 by the discriminator 274 also discharges the integrator capacitor through suitable circuitry (not shown) in the storage circuit 272. The cycle is repeated each time a clock pulse is applied to the input I270 of the storage device 272.

Figure 14:
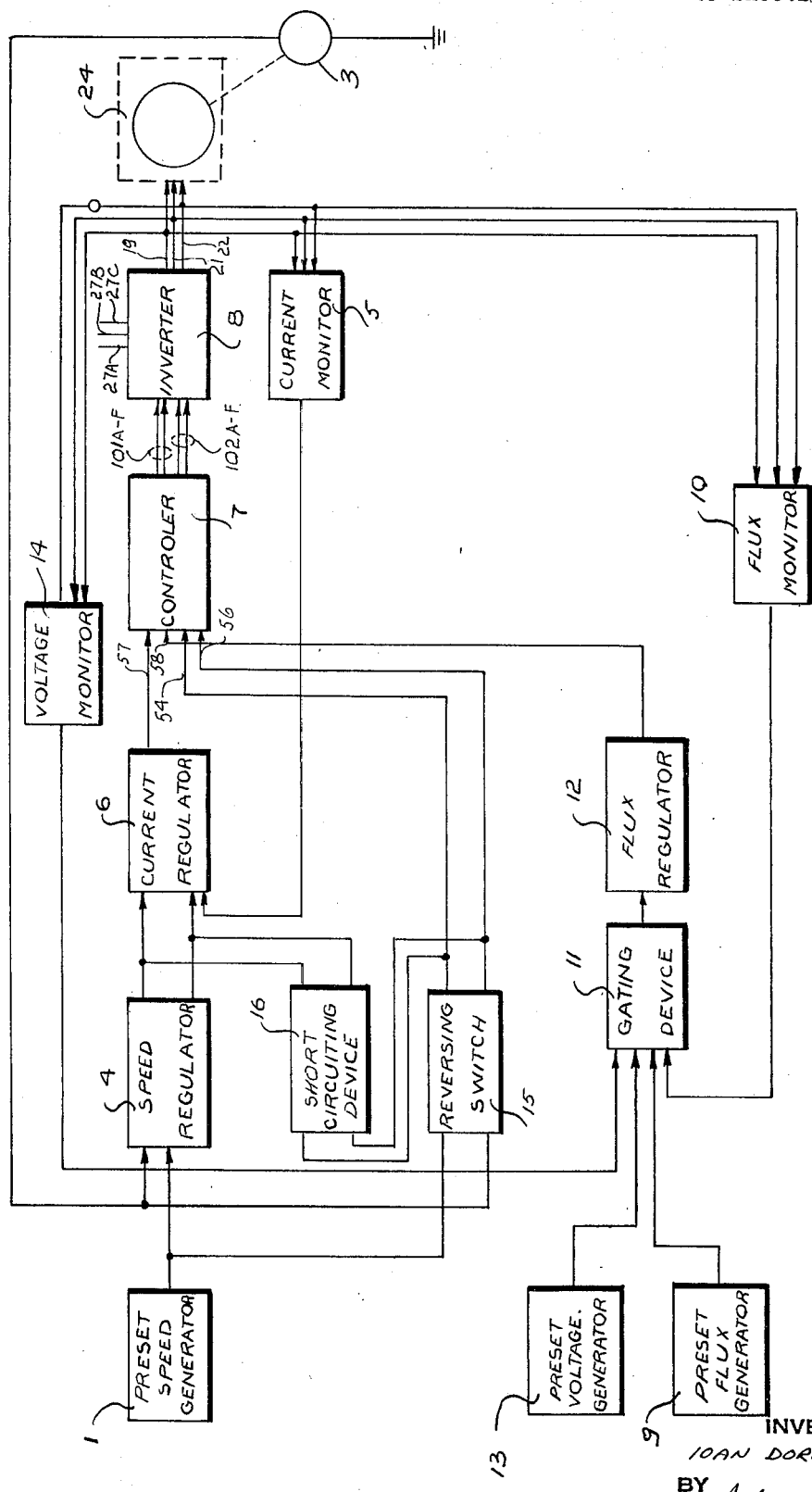
FIG. 14 is a block diagram of an arrangement similar to FIG. 2 but additionally incorporating means for reversing the sense of the three-phase excitation of the stator winding when the relative senses of the instantaneous motor speed and the preset motor speed reverse.

FIG. 14 shows an overall block diagram of a motor frequency and voltage control system similar to that of FIG. 2 but additionally incorporating facilities for reversing the sense of the three-phase excitation pattern of the stator winding each time the sense of the difference between the actual motor speed and the preset motor speed reverses. Corresponding components in FIGS. 2 and 14 have been given corresponding reference numerals.

To provide this reversing capability, a static reversing switch 15 that is shown in more detail in FIG. 15 generates outputs O151 and O152 on leads 54 and 56 (FIG. 14) which selectively alter the pattern of application of the pulse sequences at the output of the ring counter 19 (FIG. 17) to the second NOR gates 21–26. The first reference signal I151 (FIG. 15) from the preset speed generator 1 and the first monitoring signal I152 from the tachimeter 3 are individually coupled to the inputs of a pair of analog-to-digital converters 221 and 222. The associated converters 221 and 222 are each designed such that (a) a negative analog DC voltage applied thereto is converted into a pair of binary bits having the binary states 1 and 0, which individually appear on first and second outputs of each converter, and (b) a positive analog DC voltage applied thereto is converted into a pair of binary bits having the binary states 0 and 1, which individually appear on the first and second outputs of each converter.

The first outputs of the converters 221 and 222 are respectively designated O2211 and O2221, and the second outputs of the converters 221 and 222 are designated O2212 and O2222. The outputs O2211 and O2222 are cross-coupled to the input of a NOR gate 223A, while the outputs O2221 and O2212 are cross-coupled to the input of a NOR gate 223B. The output O2221 and the output of the gate 223A are respectively coupled to the input of a NOR gate 223C. The output of the gate 223C forms one output O151 of the reversing switch 15. The output O2222 and the output of the gate 223B are coupled to the inputs of a NOR gate 223D. The output of the gate 223D forms the second output O152 of the reversing switch 15. With this arrangement, an enabling pulse appears on the output O151 but not on the output O152 when the relative polarities of the analog signals I151 and I152 are of one sense. On the other hand an enabling pulse appears on the output O152 but not on the output O151 when the relative polarities of the analog signals I151 and I152 are of the opposite sense.

The outputs O151, and O152 of the reversing switch 15 individually appear on lines 54 and 55 (FIG. 14) coupled to the input of the controller 7. The outputs O151 and O152 are also coupled to inputs I161 and I162 of a short circuiting device 16. As shown in FIG. 16, the device 16 is a conventional binary storage circuit or flip-flop 251 which responds to the switching of its inputs I161 to I162 to enable alternate ones of a pair of switching transistors 252 and 253. The transistors 252 and 253 have common emitters and individual collectors O161 and O162 which form the output terminals of the device 16. Unlike the situation contemplated in FIG. 2, both of the oppositely poled outputs O41 and O42 (FIG. 6) of the speed regulator 4 are coupled to the input of the speed regulator 6 in the reversing scheme of FIG. 14; and the outputs O161 and O162 of the short circuiting device 16 are respectively coupled to the outputs O41 and O42 of the speed controlled 4 for grounding (and thereby disabling) a selected one of the outputs O41 and O42. Thus, the sign of the reference current input to the current regulator 6 will reverse each time the sense of the relative polarities of the voltages I151 and I152 reverse.

Figure 17:
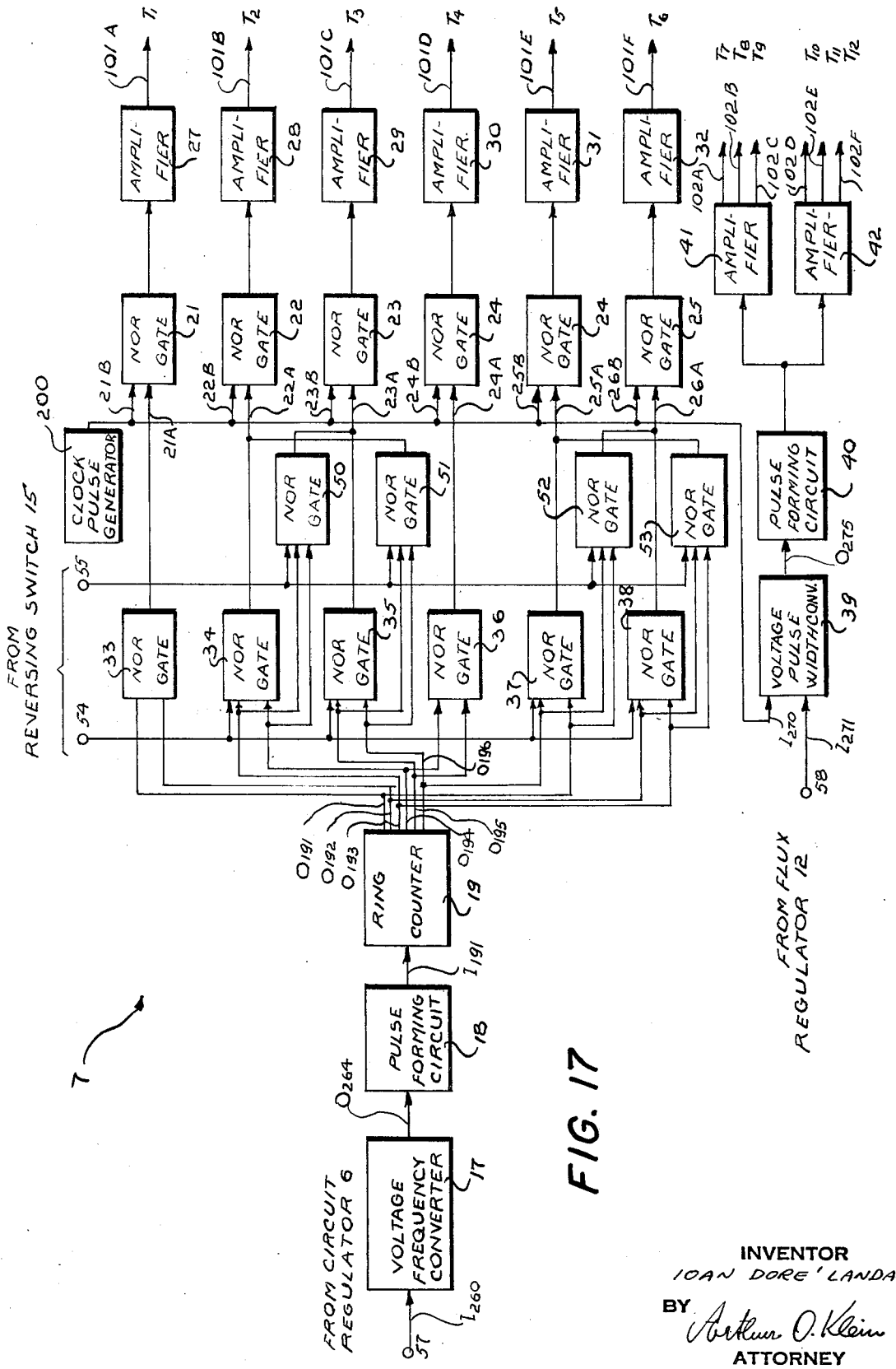
FIG. 17 is a block diagram of a portion of an arrangement of FIG. 14.
Figure 18:
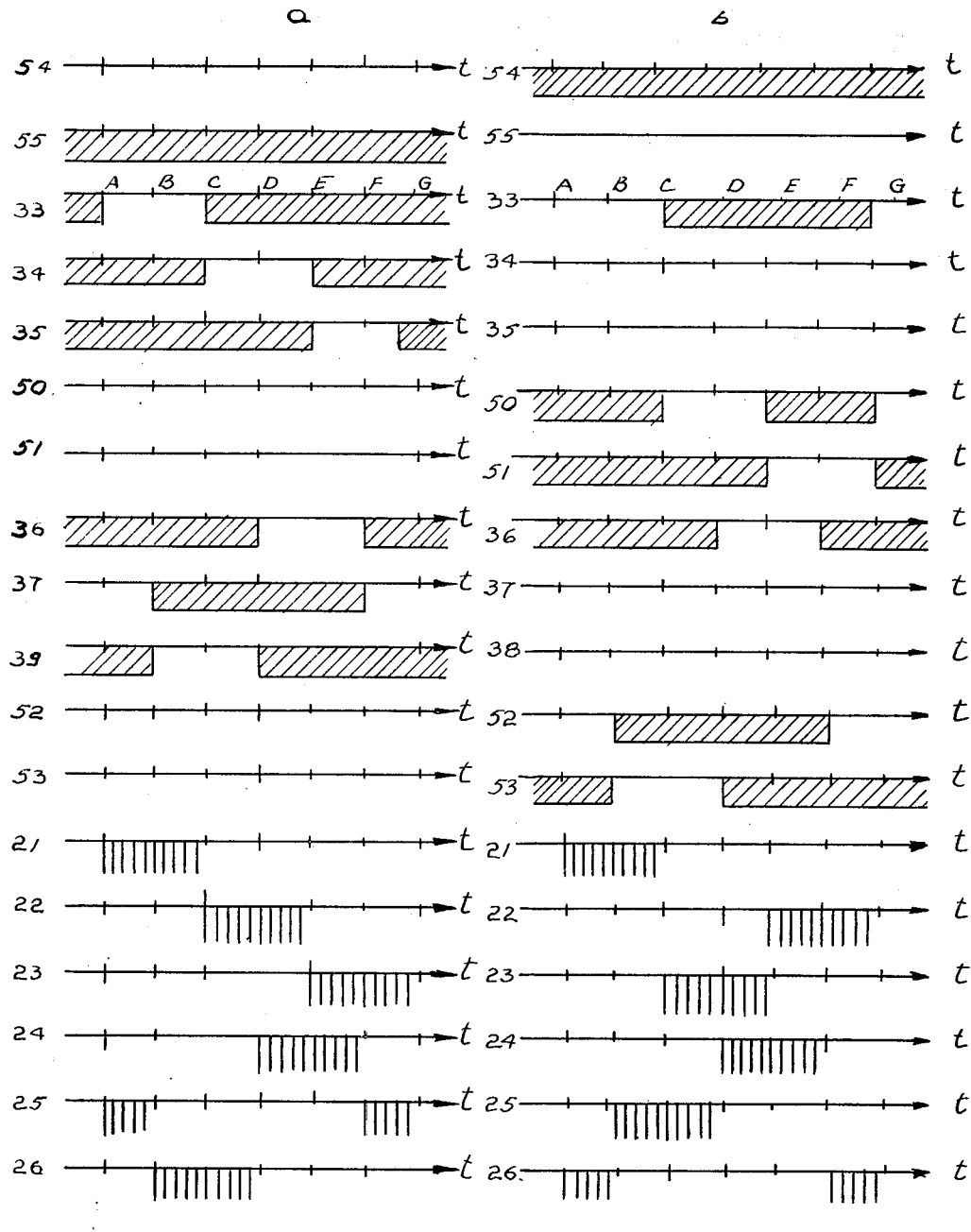
FIG. 18 is a set of wave form diagrams at various points of the arrangement of FIG. 17.

The manner in which the reversing switch 15 controls the sense of the three-phase excitation pattern of the stator windings 19, 21, and 22 is shown best in FIGS. 17 and 18. The latter figures are similar to the block and waveform diagrams shown for the non reversing situation in FIGS. 10 and 11, except that additional NOR coincidence logic has been incorporated in FIGS. 17 and 18 to select the overlapping sequences of conditioning pulses applied to the NOR gates 21–26 in one of the two complementary patterns. This allows the first devices $T_1-T_6$ in the inverter 8 (FIG. 1) to be excited in either one of the opposite three-phase excitation patterns defined by Tables 1 and 2 above, depending on the relative signs of the analog signals representing the actual and preset motor speeds. Thus, when an enabling pulse O151 appears on the line 54 (FIG. 17) from the reversing switch 15, the outputs of the ring counter 19 are combined in the gates 33–38 to condition the NOR gates 21–26 in the pattern shown in FIG. 18A, which corresponds to the inverter excitation pattern corresponding to Table 1. When the enabling pulses from the reversing switch 15 are switched from the line 54 to the line 55, however, the NOR gates 34, 35, 37, and 38 are disabled and a second plurality of NOR gates 50, 51, 52, and 53 are enabled, so that the conditioning inputs of the gates 21–26 are respectively coupled to the outputs of the gates 33, 50, 51, 36, 52, and 53. In this case, the outputs of the ring counter 19 condition the NOR gates 21–26 in the pattern shown in FIG. 18B, which corresponds to the inverter excitation pattern of Table 2.

In the foregoing, the invention has been described in connection with a preferred embodiment thereof. Many variations and modifications will now become apparent to those skilled in the art. Accordingly, it is intended that the scope of the appended claims not be limited to the specific disclosure herein contained.

What is claimed is:

1. Apparatus for controlling the excitation frequency and voltage of an asynchronous motor having a three-phase stator winding, which comprises:
    a stator power supply comprising, in combination, three output lines individually connected to the separate phases of the stator winding, and a plurality of first normally inoperative thyratron-like switching means for interconnecting an external DC source with predetermined pairs of the output lines;
    means for cyclically conditioning the switching means for operation over a selectable interval in a sequence effective to define a three-phase excitation pattern of the stator in one of two opposite senses the length of the conditioned interval determining the excitation frequency of the motor;
    means rendered effective over a selectable fraction of each conditioned interval for operating the conditioned switching means to couple pulses of the DC voltage from the source to the associated pair of output lines, the operated fraction of each conditioned interval determining the excitation voltage of the motor;
    first, second and third means individually responsive to deviations of the actual values of motor speed, current and flux from reference values of the motor speed, current and flux for generating first, second and third difference signals, respectively;
    means for connecting the first and second generating means in cascade so that the first difference signal constitutes the reference value of the motor current;
    means for adjusting the length of the conditioned interval in accordance with the magnitude of the second difference signal; and
    means for adjusting the operated fraction of each conditioned interval in accordance with the magnitude of the third difference signal.

2. Apparatus as defined in claim 1, in which the switching means comprises in combination, a plurality of first silicon controlled rectifiers each having a control electrode and a transconductive path; and means for grouping the transconductive paths of selected pairs of the first rectifiers in series between the DC source and the associated pairs of output lines.

3. Apparatus as defined in claim 2, in which the conditioning means comprises, in combination:
    means for converting the second difference signal into a first sequence of pulses having a frequency $f_1$ proportional to the amplitude of the second difference signal;
    means for converting the first pulse sequence into N substantially identical, overlapping second sequences of pulses, each second sequence having a frequency $F_1/N$; a plurality of normally disabled first gates each having a conditioning input and an enabling input;
    means for individually coupling the overlapping second pulse sequences to the conditioning inputs of the first gates in one of two complementary interconnection patterns to establish the one sense of the three-phase stator excitation; and
    means for individually coupling the outputs of the first gates to the control electrodes of the first rectifiers.

4. Apparatus as defined in claim 3, in which the apparatus further comprises:
    a plurality of second silicon controlled rectifiers having control electrodes and transconductive paths, the latter being individually coupled across the first rectifiers; and the operating means comprises, in combination,
    fourth means for generating a first succession of clock pulses at a rate proportional to but greater than $F_1$;
    means for applying the first clock pulses to the enabling inputs of each of the first gates;
    fifth means operative at a rate proportional to the operating rate of the fourth generating means for generating a second sequence of clock pulses occurring between successive ones of the first sequence of clock pulses, the second clock pulses individually trailing the first clock pulses by a selectable portion of the first clock pulse period; and
    means for applying the second clock pulses to the control electrodes of the second rectifiers.

5. Apparatus as defined in claim 4, in which the first generating means comprises, in combination;
    a tachometer for providing a first monitoring signal proportional to the actual motor speed;
    a first amplifier having first and second outputs respectively poled 180° apart in phase, the first difference signal appearing on a selected one of the two outputs of the amplifier;
    means for generating a first control signal corresponding to a preselected function of the first monitoring signal;
    means for combining the first control signal and a first reference signal proportional to the preset motor speed to form a second control signal; and first means for applying the second control signal to the input of the first amplifier.

6. Apparatus as defined in claim 5, in which the apparatus further comprises;

means rendered effective when the second control signal reverses sign for reversing the sense of the excitation pattern of the stator winding;

the reversing means comprising, in combination,
sixth and seventh means for individually generating a pair of binary bits having a distinct pattern of states in response to the application thereto of positive and negative analog voltages, respectively;
means for applying the first monitoring signal to the input of the sixth generating means;
means for applying the first reference signal to the input of the seventh generating means;
eighth means for generating an enabling pulse on a first output thereof in response to one pattern of states generated by the sixth and seventh generating means and for generating an enabling pulse on a second output thereof in response to a second pattern of such states; and
means operative when the enabling pulse from the eighth generating means is switched from one to the other of its outputs for altering the interconnection pattern of the overlapping second pulse sequences to the first gates to establish the opposite sense of the three-phase stator excitation.

7. Apparatus as defined in claim 6, in which the first applying means couples a selectable one of the first and second outputs of the first amplifier to the input of the second amplifier, and the reversing means further comprises:
means operative when the enabling pulse from the eighth switching means is switched from one to the other of the outputs thereof for alternately connecting the first and second outputs of the first amplifier to the input of the second amplifier.

8. Apparatus for controlling the excitation frequency and voltage of an asynchronous motor having a three-phase stator winding, which comprises:
a stator power supply comprising, in combination, three output lines individually connected to the separate phases of the stator winding, and a plurality of first normally inoperative thyratron-like switching means for interconnecting an external DC source with predetermined pairs of the output lines;
means for cyclically conditioning the switching means for operation over a selectable interval in a sequence effective to define a three-phase excitation pattern of the stator in one of two opposite senses, the length of the conditioned interval determining the excitation frequency of the motor;
means rendered effective over a selectable fraction of each conditioned interval for operating the conditioned switching means to couple pulses of the DC voltage from the source to the associated pair of output lines, the operated fraction of each conditioned interval determining the excitation voltage of the motor;
first means responsive to the deviation of the actual motor speed from a reference value of motor speed for generating a first difference signal;
second means responsive to the deviation of the actual motor current from a reference value of motor current for generating a second difference signal, the second generating means comprising, in combination, means for generating a monitoring signal proportional to the real part of the instantaneous motor current; first, second, and third amplifiers connected in cascade, each of the amplifiers having first and second outputs, the second difference signal appearing on a selected one of the outputs of the third amplifier; first, second, and third feedback paths individually extending from one output of the first, second, and third amplifiers to the input thereof, the first path having a capacitance, the second path having a resistance and a capacitance, and the third path having a resistance; means for applying the monitoring signal in parallel to the inputs of the first, second, and third amplifiers; and means for applying the first difference signal to the input of the first amplifier so that the first difference signal constitutes the reference value of the motor current;
means for adjusting the length of the conditioned interval in accordance with the magnitude of the second difference signal;
third means responsive to a deviation of the actual motor flux from a reference value of motor flux for generating a third difference signal; and
means for adjusting the operated fraction of each conditioned interval in accordance with the magnitude of the third difference signal.

9. Apparatus for controlling the excitation frequency and voltage of an asynchronous motor having a three-phase stator winding, which comprises:
a stator power supply comprising, in combination, three output lines individually connected to the separate phases of the stator winding, and a plurality of first normally inoperative thyratron-like switching means for interconnecting an external DC source with predetermined pairs of the output lines;
means for cyclically conditioning the switching means for operation over a selectable interval in a sequence effective to define a three-phase excitation pattern of the stator in one of two opposite senses, the length of the conditioned interval determining the excitation frequency of the motor;
means rendered effective over a selectable fraction of each conditioned interval for operating the conditioned switching means to couple pulses of the DC voltage from the source to the associated pair of output lines, the operated fraction of each conditioned interval determining the excitation voltage of the motor;
first and second means individually responsive to the deviation of the actual motor speed and current from reference values of motor speed and current for generating first and second difference signals, respectively;
means for connecting the first and second generating means in cascade so that the first difference signal constitutes the reference value of motor current;
means for adjusting the length of the conditioned interval in accordance with the magnitude of the second difference signal;
third means responsive to a deviation of the actual motor flux from a reference value of motor flux for generating a third difference signal, the third generating means comprising, in combination, means for generating a first monitoring signal proportional to the instantaneous motor flux; and amplifier having first and second outputs, the third difference signal appearing on a selected one of the outputs of the amplifier; a feedback path including a resistance and a capacitance extending from the output to the input of the amplifier; means for combining the first monitoring signal and a reference signal proportional to a preset motor flux to form a first control signal; and means for applying the first control signal to the input of the amplifier; and
means for adjusting the operated fraction of each conditioned interval in accordance with the magnitude of the third difference signal.

10. Apparatus as defined in claim 9, in which the apparatus further comprises, in combination, means for generating a second monitoring signal proportional to the instantaneous stator voltage; means for combining the second monitoring signal with a signal proportional to a preset stator voltage to generate a second control signal; and means operative when the magnitude of the second control signal approaches zero for decoupling the first control signal from the input of the amplifier and for coupling the second control signal to the input of the amplifier.

References Cited

UNITED STATES PATENTS

| | | | |
|---|---|---|---|
| 3,355,654 | 11/1967 | Risberg | 318—227 XR |
| 3,372,323 | 3/1968 | Guyeska | 318—213 XR |
| 3,394,297 | 7/1968 | Risberg | 18—227 |

THOMAS E. LYNCH, Primary Examiner

U.S. Cl. X.R.

318—230, 231; 321—5